(12) United States Patent
Arakawa et al.

(10) Patent No.: US 8,401,844 B2
(45) Date of Patent: Mar. 19, 2013

(54) GAIN CONTROL SYSTEM, GAIN CONTROL METHOD, AND GAIN CONTROL PROGRAM

(75) Inventors: Takayuki Arakawa, Tokyo (JP); Masanori Tsujikawa, Tokyo (JP)

(73) Assignee: NEC Corporation, Tokyo (JP)

( * ) Notice: Subject to any disclaimer, the term of this patent is extended or adjusted under 35 U.S.C. 154(b) by 1141 days.

(21) Appl. No.: 12/227,902

(22) PCT Filed: Jan. 16, 2007

(86) PCT No.: PCT/JP2007/050491
§ 371 (c)(1),
(2), (4) Date: Dec. 2, 2008

(87) PCT Pub. No.: WO2007/141923
PCT Pub. Date: Dec. 13, 2007

(65) Prior Publication Data
US 2009/0259461 A1 Oct. 15, 2009

(30) Foreign Application Priority Data
Jun. 2, 2006 (JP) .................................. 2006-154994

(51) Int. Cl.
*G10L 19/12* (2006.01)
*G10L 19/14* (2006.01)
*H03G 3/00* (2006.01)

(52) U.S. Cl. ........ 704/225; 704/224; 704/226; 381/107; 381/108

(58) Field of Classification Search ................... 704/225
See application file for complete search history.

(56) References Cited

U.S. PATENT DOCUMENTS

| 6,154,549 | A  | * | 11/2000 | Arnold et al. | .................. 381/104 |
| 6,353,671 | B1 | * | 3/2002 | Kandel et al. | .................. 381/318 |
| 6,513,005 | B1 |   | 1/2003 | Qin et al. | |
| 6,647,123 | B2 | * | 11/2003 | Kandel et al. | .................. 381/318 |

(Continued)

FOREIGN PATENT DOCUMENTS
CN  1282072 A  1/2001
JP  1-236000 A  9/1989

(Continued)

OTHER PUBLICATIONS

Xuan, Guorong, et al., "EM Algorithms of Gaussian Mixture Model and Hidden Markov Model", Department of Computer Science, Tongji University, 2001, pp. 1-4.

(Continued)

*Primary Examiner* — Pierre-Louis Desir
*Assistant Examiner* — Matthew Baker
(74) *Attorney, Agent, or Firm* — Foley & Lardner LLP

(57) ABSTRACT

Disclosed is a gain control system in which speech model constituted from a sound pressure and a feature is stored in a speech model storage unit for each of a plurality of phonemes or for each of clusters into which a speech is divided. When an input signal is given, a feature conversion unit calculates a feature and a sound pressure of the input signal. A sound pressure comparison unit determines a sound pressure ratio between the input signal and each of speech models. A distance calculation unit calculates a distance between the feature of the input signal and the feature of each of the speech models. A gain calculation unit calculates a gain value from the sound pressure ratio and information on the distance. A sound pressure compensation unit thereby compensates for the sound pressure of the input signal.

20 Claims, 11 Drawing Sheets

U.S. PATENT DOCUMENTS

| | | | |
|---|---|---|---|
| 7,483,831 B2 * | 1/2009 | Rankovic | 704/225 |
| 7,516,065 B2 * | 4/2009 | Marumoto | 704/215 |
| 7,539,614 B2 * | 5/2009 | Macours | 704/225 |
| 8,103,007 B2 * | 1/2012 | Shields et al. | 381/57 |
| 2003/0055635 A1 * | 3/2003 | Bizjak | 704/225 |
| 2004/0117181 A1 | 6/2004 | Morii et al. | |
| 2004/0143433 A1 * | 7/2004 | Marumoto et al. | 704/225 |
| 2004/0260546 A1 | 12/2004 | Seo et al. | |
| 2005/0015252 A1 * | 1/2005 | Marumoto | 704/234 |
| 2005/0080626 A1 * | 4/2005 | Marumoto et al. | 704/269 |
| 2005/0108008 A1 * | 5/2005 | Macours | 704/225 |
| 2007/0147625 A1 * | 6/2007 | Shields et al. | 381/57 |
| 2008/0027705 A1 | 1/2008 | Koga | |

FOREIGN PATENT DOCUMENTS

| | | |
|---|---|---|
| JP | 4-24697 | 1/1992 |
| JP | 6-149289 | 5/1994 |
| JP | 10-254493 A | 9/1998 |
| JP | 2000-259177 A | 9/2000 |
| JP | 2000-349865 A | 12/2000 |
| JP | 2004-015125 | 1/2004 |
| JP | 2004-139049 | 5/2004 |
| JP | 2004-325897 | 11/2004 |
| JP | 2005-70430 A | 3/2005 |
| JP | 2005-258186 | 9/2005 |
| JP | 2007-511793 A | 5/2007 |
| JP | 2008-32834 A | 2/2008 |
| WO | WO 2005/048242 A1 | 5/2005 |

OTHER PUBLICATIONS

Gales, Mark J.F., et al., "Robust Continuous Speech Recognition Using Parallel Model Combination", IEEE Transactions of Speech and Audio Processing, vol. 4, No. 5, Sep. 1996, pp. 1-8.

Minami, Yasuhiro, et al., A Maximum likelihood procedure for a universal adaptation method based on HMM composition:, NTT Human Interface Laboratories, 1995, pp. 1-4.

Takada, Kenji, et al., "Word Recognition Using the HMM Composition Method Which Suits a Signal-to-Noise Ratio Automatically", The Institute of Electronics, Information and Communication Engineers, 2002, pp. 1-6.

Boll, Steven, "Suppression of Acoustic Noise in Speech Using Spectral Subtraction", IEEE Transactions of Acoustics, Speech, Processing, vol. ASSP-27, No. 2, Apr. 1979, pp. 1-8.

R. O. Duda, et al., "Pattern classification," John Willey & Sons, Singijuto Communications, pp. 528-529, Jul. 3, 2001, supervised/translated by Morio Onoue.

* cited by examiner

GAIN CONTROL SYSTEM, GAIN CONTROL METHOD, AND GAIN CONTROL PROGRAM

TECHNICAL FIELD

The present invention relates to a gain control system, a gain control method, and a gain control program which make sound pressure of an output signal constant without depending on the sound pressure of an input signal. The invention also relates to a speech recognition system, a speech recognition method, and a speech recognition program that use this gain control method.

BACKGROUND ART

Terms used in this specification will be defined.

A "sound pressure of a speech" is defined to be a rise in ambient pressure when the speech is present. The sound pressure is expressed in units of [N/m2]. This amount is proportional to the square root of energy of the speech and an amplitude value of the waveform of the speech.

A "sound pressure level" is defined to be a logarithmic measure indicating a ratio of the sound pressure of a target speech relative to a reference sound pressure. The sound pressure level is expressed in units of [dB]. Specifically, the sound pressure level is expressed by the following Expression (1):

$$\text{Sound Pressure Level} = 20 \log 10(\text{Sound Pressure of Target Speech/Reference Sound Pressure}) \quad (1)$$

A "gain" is defined to be a ratio between the sound pressure of an output signal and the sound pressure of an input signal. Specifically, the gain is defined by the following Expression (2):

$$\text{Gain} = \text{Sound Pressure of Output Signal/Sound Pressure of Input Signal} \quad (2)$$

The purpose of a gain control apparatus used for normal audio communication or audio recording is to transform an input signal to a sound pressure that is easy to hear by a human being and then output the transformed sound pressure.

On contrast therewith, the purpose of a gain control apparatus used for speech recognition is to match the sound pressure of an input signal to the sound pressure of a speech model prepared for in advance by training.

As described in Non-patent Document 1, a speech model is obtained by converting a speech spectrum into a feature, and the probability of the feature is expressed by a probability model such an HMM (Hidden Markov Model) or a GMM (Gaussian Mixture Model).

FIG. 9 is a diagram showing a configuration of a gain control apparatus used for audio communication or audio recording, described in Patent Document 1. The gain control apparatus in FIG. 9 includes an input signal acquisition unit 1 to which an audio signal is supplied, a plurality of band division filter means 11 that pass only signals of mutually different frequency bands that have been set in advance, absolute value converting means 12 that convert respective signals output from the band division filter means 11 into absolute values, respectively, weighting data storage means 13 for storing therein data for weighting for each frequency band divided by the band division filter means 11, a multiplier unit 14 that multiplies the absolute values obtained by the conversion by the weighting data, an adder unit 15 that sums the weighted values, gain compensation means 16 for compensating the summed value, threshold level storage means 17 that stores therein threshold level data to be compared with the compensated value, comparison means 18 for comparing the compensated value with the threshold level data, gain generation means 19 for generating a gain value based on the result of comparison by the comparison means 18, envelope generation means 20 for smoothing a variation of the gain value, and a sound pressure compensation unit 7 that multiplies the input signal by the gain value output from the envelope generation means 20, thereby performing sound pressure level compensation. With this arrangement, the input signal can be weighted for each frequency band that is highly likely to be a speech, and gain control is performed, based on weighted signals.

In the configuration in FIG. 9, however, a constant sound pressure is output without consideration of a sound pressure difference for each phoneme, as shown in FIG. 10. Thus, an unnatural speech may be produced.

For example, generally, vowel sounds may have large sound pressures, while consonants may have small sound pressures. The configuration in FIG. 9 does not take into consideration a difference between the sound pressures of the vowel sounds and the consonants, and produces the constant sound pressure. Thus, the speech is output where consonants are excessively emphasized.

When the gain control apparatus is combined with a speech recognition apparatus that needs sound pressure information, this constant sound pressure output becomes a great problem, leading to deterioration in recognition performance.

Further, when the frequency band of noise is superimposed on the frequency band of a target speech, there is also a problem that the noise is emphasized.

Next, a gain control apparatus used for speech recognition will be described. In normal speech recognition, in order to obtain the recognition which is robust to variations in sound pressure, the recognition is performed without using a zeroth cepstrum component or a power feature that depends on the sound pressure.

However, in an approach to adapting a speech model to noise, like a PMC (Parallel Model Combination) method known as a speech recognition approach effective under noisy circumstances, information on the zeroth cepstrum component that depends on the sound pressure becomes necessary. Thus, a gain control method is needed (refer to Non-patent Document 2).

FIG. 11 illustrates a PMC method, which is an example of synthesizing a noise adapted model using a clean acoustic model (clean speech model) and a noise model.

By applying an inverse cosine transform and an exponential transform to the speech model trained with a clean speech in the cepstral domain in advance, spectral transformation is performed. A clean speech spectrum is thereby obtained.

By applying the inverse cosine transform and the exponential transform to the noise model trained in a silent segment before utterance of the speech, spectral transformation is performed. A noise spectrum is thereby obtained.

Next, the clean speech spectrum is multiplied by a level adjustment coefficient g (also referred to as a "level compensation coefficient"), and then added to the noise spectrum, thereby deriving the noise-adaptive speech spectrum.

Next, logarithmic conversion and a cosine transform are applied to the noise-adaptive spectrum, thereby obtaining a noise-adaptive speech model.

At a time of recognition, the recognition is performed by comparing an input signal with the noise-adaptive speech model.

In the PMC method, by multiplying the level compensation coefficient g, a mixture ratio between the sound pressure of the speech model and the sound pressure of the noise model worked out from the input signal is adjusted.

Accordingly, multiplication of the level adjustment coefficient g may be considered to be a kind of gain control.

In Non-patent Document 3 and Non-patent Document 4, the level adjustment coefficient g is estimated, based on a likelihood maximization criteria.

Specifically, the following methods are provided:
(A) a method of preparing for a plurality of speech models for sound pressures, and selecting a speech model, likelihood of which is maximum; and
(B) a method of regarding a gain value as a variable, and performing estimation repetitively so that the likelihood is maximum for each Gaussian distribution that constitutes a speech model.

In the two methods described above, the gain control is performed, based on the sound pressure of a speech at a time of training. Thus, the gain control that reflects a sound pressure difference for each phoneme may be performed.

However, in the method (A) in which the speech models for the sound pressures are prepared for in advance, it is necessary to prepare for a lot of speech models, in each of which a sound pressure is changed for each of all phonemes so as to perform accurate estimation. Thus, in terms of capacity and the amount of computation, this method costs much.

In the method (B) of regarding the gain as the variable and repetitively performing estimation, there are a problem that the repetitive estimation needs much computation cost and a problem that sound pressure matching is performed based on a completely different when the first set value of the gain differs.

Patent Document 1: JP Patent Kokai Publication No. JP-P-2004-15125A

Non-patent Document 1: Gourong Xuan, Wei Zhang, Peiqi Chai, "EM Algorithms of Gaussian Mixture Model and Hidden Markov Model", IEEE International Conference on Image Processing ICIP 2001, vol. 1, pp. 145-148. 2001

Non-patent Document 2: M. J. F. Gales and S. J. Young, "Robust Continuous Speech Recognition Using Parallel Model Combination", IEEE Trans. SAP-4, No. 5, pp. 352-359. September 1996

Non-patent Document 3: Y. Minami and S. Furui, "A Maximum Likelihood Procedure for a Universal Adaptation Method Based on HMM Composition", IEE ICASSP'95, 129-132. 1995

Non-patent Document 4: Kenji Takada and Jun Toyama, "Word Recognition Using the HMM Composition Method Which Suits a Signal-to-Noise Ratio Automatically", IEICE Technical Report, SP2002-97 pp. 19-24, 2002

Non-patent Document 5: Richard O. Duda, Petter E. Hart, David G. Stork, supervised/translated by Morio Onoue, "Pattern Classification", John Willey & Sons. Singijutu Communications, pp. 528-529

Non-patent Document 6: "Suppression of Acoustic Noise in Speech Using Spectral Substration," IEEE Trans. ASSP 27, pp. 113-120, 1979

SUMMARY OF THE DISCLOSURE

The following analysis is given by the present invention. As described above, the conventional systems have problems described below.

A first problem is that in the conventional gain control technique used for audio communication or audio recording, a sound pressure difference for each phoneme is not taken into consideration. Thus, an unnatural speech is produced.

A second problem is that, in the conventional gain control technique used for audio communication or audio recording, when the frequency band of noise overlaps with the frequency of a target speech, the noise is emphasized.

A third problem is that, in the gain control technique based on likelihood maximization criteria, used for speech recognition, a plurality of speech models for sound pressures are prepared for each of phonemes prepared for the speech recognition, or estimation is performed for each phoneme a plurality of times, so that the gain control technique costs much in terms of capacity and the amount of computation.

A fourth problem is that, in the conventional gain control technique based on the likelihood maximization criteria, used for the speech recognition, when an initially set gain value is different, a completely different phoneme is derived.

Accordingly, an object of the present invention is to provide a gain control apparatus and a gain control program capable of outputting a natural speech by reflecting a sound pressure difference for each phoneme.

Another object of the present invention is to provide a gain control apparatus and a gain control program that accurately emphasize a target speech without emphasizing unnecessary noise.

Still another object of the present invention is to provide a gain control apparatus and a gain control program using a small capacity and low computation cost.

Still another object of the present invention is to provide a gain control apparatus and a gain control program that perform sound pressure control with a phoneme characteristic being maintained.

The invention disclosed in this application is generally configured as follows.

A first gain control system according to the present invention includes an input signal acquisition unit, a feature conversion unit, a speech model storage unit, a sound pressure comparison unit, a distance calculation unit, gain value calculation means, and sound pressure compensation means. In the speech model storage unit described above, a speech model having a feature and a sound pressure, provided for each of a plurality of phonemes or for each of clusters into which a speech is divided according to the feature distance, is stored.

A first gain control method according to the present invention includes:
an input signal acquisition step of acquiring a speech signal and cutting and dividing the speech signal for each unit time;
a feature conversion step of calculating a feature from the input signal extracted for each unit time;
a speech model storage step of storing a speech model having a feature and sound pressure information in each phoneme or each of clusters into which a speech is divided;
a sound pressure comparison step of calculating a ratio between a sound pressure of the input signal extracted for the each unit time and a sound pressure of the speech model;
a distance calculation step of calculating a distance between the feature of the input signal extracted for the each unit time and the feature of the speech model;
a gain value calculation step of taking a weighted average of the sound pressure ratio for the speech model, thereby calculating a gain; and
a sound pressure compensation step of compensating for the sound pressure of the input signal, using the calculated gain.

A first gain control program according to the present invention includes a program for execution of the processes of:
acquiring an input signal and cutting and dividing the input signal for each unit time;

converting the input signal for each unit time into a feature;

comparing a sound pressure of the input signal for each unit time with a sound pressure of each speech model;

calculating a distance between the feature of the input signal for each time and a feature of the speech model;

calculating a gain value by taking a weighted average of sound pressure ratios for a plurality of the speech models; and compensating for a sound pressure level of an input speech using the calculated gain value.

With this arrangement, by using the speech model having the feature and the sound pressure for each phoneme or for each cluster unit, a sound pressure difference for each phoneme can be reflected. A first object can be thereby achieved.

Further, by using the speech model having the feature and the sound pressure for each phoneme or for each cluster unit, a target speech can be accurately emphasized without emphasizing unwanted noise. A second object can be thereby achieved.

Further, the speech model having the feature and the sound pressure for each phoneme or for each cluster unit is provided, and the weighted average of the sound pressure ratio between the input signal and each of the plurality of the sound models according to the difference is taken for the plurality of the sound models, thereby calculating the gain. The need for preparing a plurality of the speech models having different sound pressures for each of all the phonemes or the need for performing estimation a plurality of times is thereby eliminated. Accordingly, the gain control system and the gain control method with a small capacity and low computation cost can be provided. A third object can be thereby achieved.

The speech models for gain control can be provided separately from speech models for speech recognition. Thus, the speech models of an appropriate size can be provided according to the constrains of capacity and computation amount. A third object can be thereby achieved.

In a second gain control method according to the present invention, gain value calculation is performed by taking a weighted average of the sound pressure ratios for the plurality of the sound models in consideration of both of the distance and occurrence frequency information for each phoneme or for each cluster in the gain value calculation step in the first gain control method, in stead of performing gain value calculation by taking the weighted average of the sound pressure ratios for the plurality of the sound models.

With this arrangement, phoneme characteristics can be accurately estimated. A fourth object can be thereby achieved.

A third gain control method according to the present invention further includes, in the first gain control method, the steps of:

obtaining a noise component from the input signal; and calculating a speech signal with the noise component suppressed from the input signal. In the feature conversion step in the first gain control method, a feature is calculated from the speech signal with the noise component suppressed from the input signal, instead of calculating the feature from the input signal.

With this arrangement, a target speech can be accurately emphasized without emphasizing the noise component of the target speech more than in the first gain control method.

In a fourth gain control method according to the present invention, instead of compensating for the sound pressure of the input signal using the calculated gain, the sound pressure of a clean speech signal is compensated for in the sound pressure compensation step in the third gain control method. The clean speech signal is generated by extracting only a clean component of the input signal with the noise component suppressed therein using the calculated gain.

A fifth gain control method according to the present invention includes:

a feature conversion step of calculating a feature with the sound pressure adjusted therein from the calculated gain and the input signal instead of the sound pressure compensation step in the first gain control method.

A first effect of the present invention is that a sound pressure difference for each phoneme can be reflected through the use of the speech model trained with the speech of a predetermined sound pressure in advance.

A second effect of the present invention is that by using the speech model having the feature and the sound pressure in each phoneme or each of clusters into which a speech is divided, a target speech can be accurately emphasized without emphasizing unwanted noise.

A third effect of the present invention is as follows. When performing gain calculation, the weighted average according to the distance is performed for the speech model provided in each phoneme or each of clusters into which a speech is divided. The need for preparing a plurality of the speech models having different sound pressures for each of all the phonemes or the need for performing estimation a plurality of times is thereby eliminated. Accordingly, the gain control system and the gain control method with a small capacity and low computation cost can be provided.

A fourth effect of the present invention is that, by performing the weighted average according to the distance for the speech model provided in each phoneme or each of clusters into which a speech is divided, sound pressure control can be performed with phoneme characteristics being maintained.

Still other features and advantages of the present invention will become readily apparent to those skilled in this art from the following detailed description in conjunction with the accompanying drawings wherein only the exemplary embodiments of the invention are shown and described, simply by way of illustration of the best mode contemplated of carrying out this invention. As will be realized, the invention is capable of other and different embodiments, and its several details are capable of modifications in various obvious respects, all without departing from the invention. Accordingly, the drawing and description are to be regarded as illustrative in nature, and not as restrictive.

DESCRIPTION OF REFERENCE NUMERALS

Preferred Modes of the Invention

Figure 1:
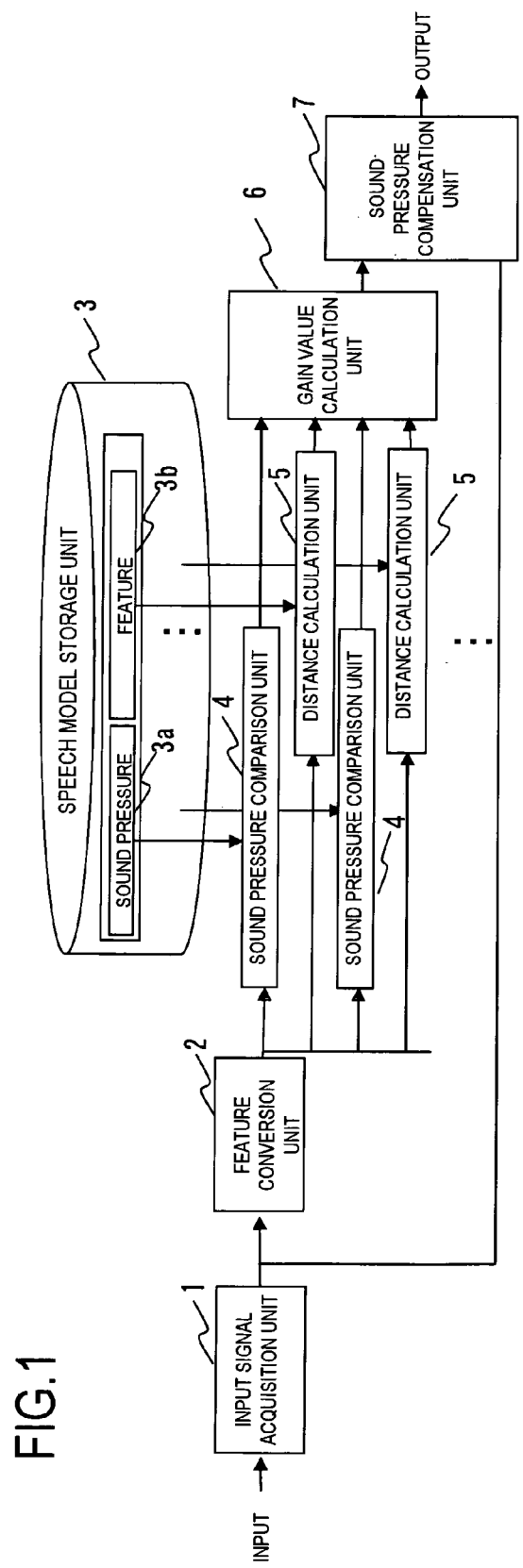
FIG. 1 is a diagram showing a configuration of a system in a first example of the present invention.

Next, preferred modes for carrying out the present invention will be described in detail with reference to drawings. The present invention includes a speech model storage unit (3) that stores therein a speech model which has been trained with a speech of a predetermined sound pressure in advance and including sound pressure information and a feature, for each phoneme and each cluster, means (2) for extracting an input signal for each unit time, analyzing the input signal, and deriving a feature of the input signal, and means (4, 5, 6) for calculating a probability P(j|C(t)) that a jth speech model stored in the speech model storage unit is selected, based on the distance between a feature ($\mu$,j) of the jth speech model and a feature (C(t)) of the input signal, weighting each speech model with a difference ($\mu$ 0,j-C(0,t)) between one of the features of the input signal that depends on a sound pressure and the sound pressure information on the speech model stored in the speech model storage unit, using the probability, thereby calculating a gain (g). Control to match the sound pressure of the input signal to the sound pressure for each phoneme or each cluster of the speech model prepared by training in advance is thereby performed. The present invention is a gain control system that adjusts a sound pressure of an input signal and produces the adjusted signal. The gain control system includes:

an input signal acquisition unit (1) that acquires a speech signal supplied from an input device and extracts the speech signal for each unit time;

a feature conversion unit (2) that calculates a feature and a sound pressure from the input signal extracted for the each unit time;

a speech model storage unit (3) that stores therein a speech model having a feature and sound pressure information (feature that depends on the sound pressure such as a zeroth cepstrum component), for each of a plurality of phonemes or each of clusters into which a speech is divided;

a distance calculation unit (5) that calculates a distance between the feature of the input signal extracted for the each unit time and the feature of the speech model stored in the speech model storage unit;

a sound pressure comparison unit (4) that calculates a ratio between the sound pressure (feature that depends on the sound pressure) of the input signal extracted for the each unit time and a sound pressure of the speech model stored in the speech model storage unit;

a gain value calculation unit (6) that calculates a gain, based on the distance and the sound pressure ratio calculated for the speech model; and a sound pressure compensation unit (7) that compensates for the sound pressure of the input signal extracted for the each unit time, using the gain calculated by the gain value calculation unit.

In another exemplary embodiment of the present invention, the speech model storage unit (designated by reference numeral 3' in FIG. 4) further stores and holds occurrence frequency information on the speech model. The gain value calculation unit (6') performs gain calculation based on the distance and the sound pressure ratio and a frequency of occurrence of the speech model stored in the speech model storage unit.

In the present invention, the gain value calculation unit may take a weighted average of the sound pressure ratio between the input signal extracted for each unit time and the speech model in each phoneme or each of clusters into which a speech is divided, using the distance between the input signal extracted for each unit time and the speech model, to calculate the gain.

Another exemplary embodiment of the present invention may include:

a noise estimation unit (indicated by reference numeral 8 in FIG. 5) that obtains a noise component from the input signal; and a clean speech estimation unit (indicated by reference numeral 9 in FIG. 5) that calculates a signal with the noise component estimated by the noise estimation unit suppressed from the input signal and outputs a signal with the noise component suppressed therein. The feature conversion unit (2) may receive the signal with the noise component suppressed therein, output from the clean speech estimation unit, and may extract a feature and a sound pressure from the input signal.

In another exemplary embodiment of the present invention, the sound pressure compensation unit (7) may receive the signal with the noise component suppressed therein, output from the clean speech estimation unit (9), and compensates for the sound pressure of the received signal.

In another exemplary embodiment of the present invention, the sound pressure compensation unit (7) may smooth or average the gain obtained for each unit time over a plurality of the unit times, and may perform sound pressure control over the plurality of unit times.

Still another exemplary embodiment of the present invention may include:

a second feature conversion unit (indicated by reference numeral 10 in FIG. 7) that calculates a feature used in speech recognition from the gain calculated by the gain value calculation unit and the input signal, in place of the speech compensation unit (7). Then, using the feature calculated by the second feature conversion unit, the speech recognition may be performed.

Still another exemplary embodiment of the present invention may include:

a second feature conversion unit (indicated by reference numeral 10 in FIG. 8) that compensates for the feature obtained by the feature conversion unit and calculates a feature used in speech recognition using the gain calculated by the gain value calculation unit, in place of the speech compensation unit. Then, using the feature calculated by the second feature conversion unit, the speech recognition may be performed. A description will be given below in connection with examples.

EXAMPLE 1

FIG. 1 is a diagram showing a configuration of a first example of the present invention. Referring to FIG. 1, the first example of the present invention includes an input signal acquisition unit 1 that acquires an input signal and extracts the input signal for each unit time, a feature conversion unit 2 that calculates the feature and the sound pressure of the input signal for each unit time, a speech model storage unit 3 that stores therein speech models, a sound pressure comparison unit 4 that compares the sound pressure of the input signal for each unit time with the sound pressure of each of the speech models and determines a sound pressure ratio, a distance calculation unit 5 that determines a distance between the feature of the input signal for each unit time and the feature of each of the speech models, a gain value calculation unit 6 that calculates a gain from the sound pressure ratio calculated by the sound pressure comparison unit 4 and the distance calculated by the distance calculation unit, and a sound pressure compensation unit 7 that uses the gain calculated by the gain value calculation unit 6 to compensate for the sound pressure of the input signal.

In the speech model storage unit 3, a plurality of speech models, each of which is prepared for each of plural phonemes or each cluster obtained by division of a speech are stored.

Herein, a "phoneme" is a vowel, a consonant, an unvoiced sound or a voiced sound, or a speech sound classified according to adjacent sound arrangement such as in the same sound of "a".

The "cluster" is a group of phonemes and obtained by division of speech according to a feature distance.

As a cluster division method, the "K-means method" (described in Non-patent Document 5), for example, may be employed. The "K-means method" is the method in which given data is classified into K clusters according to the distance.

Each speech model is constituted from a sound pressure 3a and a feature 3b. As the sound pressure 3a, a zeroth cepstrum component is employed. As the feature 3b, a value obtained by converting a speech into the feature may be employed, or a density distribution of probabilities of outputting the value may be employed.

The sound pressure 3a and the feature 3b are prepared by training in advance, using an "Expectation Maximization" (EM) algorithm (refer to Non-patent Document 1) and the like. The cluster may be determined using the EM algorithm.

Figure 2:
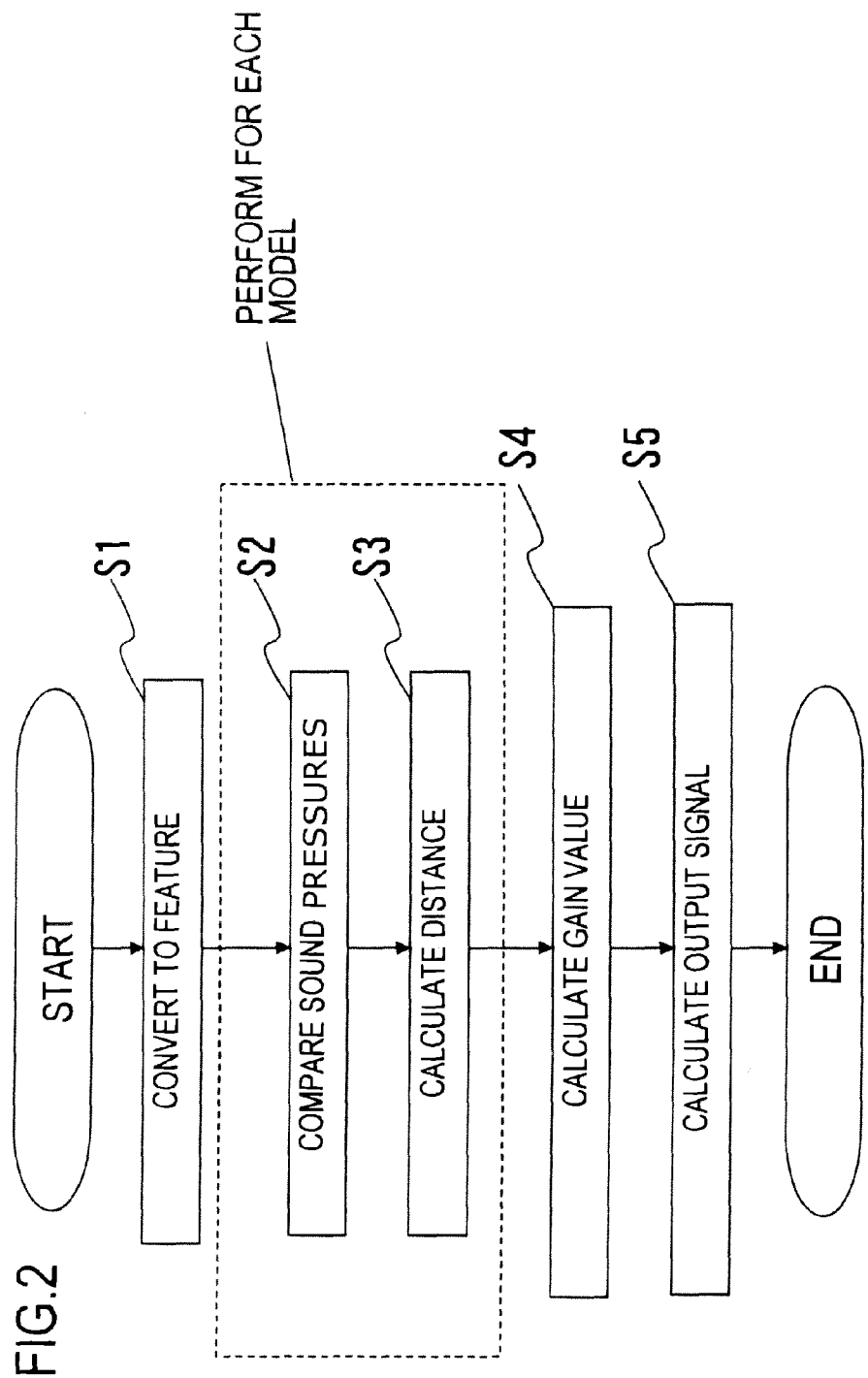
FIG. 2 is a flowchart showing process procedures in the first example of the present invention.

Next, an overall operation of this example will be described in detail, with reference to FIG. 1 and a flowchart in FIG. 2.

An input signal is windowed and extracted for each time period, and is subjected to Fourier analysis. A spectrum calculated by Fourier analysis is expressed by $X(f,t)$, where f indicate a number in a frequency direction, and t indicates a number (frame number) in a temporal direction.

The feature conversion unit 2 calculates the feature of the input signal. Herein, as the feature, one of the following features is employed:
spectrum
logarithmic spectrum
cepstrum
pitch
power
Δ (first-order differential) quantity of the spectrum, logarithmic spectrum, cepstrum, pitch, or power
ΔΔ (second-order differential quantity)

In this example, cepstrum is assumed to be a feature. The cepstrum is calculated using Expression (3) (in step S1).

$$C(t) = DCT[\log[X(t)]] \quad (3)$$

where $X(t)$ is a vector including $X(f, t)$ as an element, and $C(t)$ is a vector including $C(i, t)$ as an element (in which i indicates a cepstral dimension). DCT[ ] indicates a discrete cosine transform.

Next steps S2 and S3 are executed on each speech model stored in the speech model storage unit 3. Comparison of the sound pressure of the input signal with the sound pressure of the speech model is made by the sound pressure comparison unit 4 (in step S2).

Specifically, since a zeroth cepstrum component represents information of the logarithmic value of a sound pressure, a difference between the zeroth cepstrum component of the speech model (the sound pressure 3a in the speech model storage unit 3) and the zeroth cepstrum component $C(0,t)$ of the input signal calculated by the feature conversion unit 2 is calculated.

$$\mu_{0,j} - C(0,t) \quad (4)$$

where $\mu_{0,j}$ indicates the zeroth cepstrum component (sound pressure 3a in the speech model storage unit 3) of a jth speech model Next, the difference between the feature of the input signal and the feature of the speech model is calculated by the distance calculation unit 5 (in step S3).

Next, the gain value calculation unit 6 estimates a gain for each model based on the difference between the zeroth cepstrum components calculated by the sound pressure comparison unit 4 and the distance calculated by the distance calculation unit 5 (in step S4).

Specifically, a probability (normalized likelihood) $P(j|C(t))$ that a jth speech model is selected is at first determined using the following expression:

$$P(j|C(t)) = \exp(-d[C(t), \mu_j]) / \Sigma_{j'} \exp(-d[C(t), \mu_{j'}]) \quad (5)$$

In Expression (5), $\exp(-d[C(t), \mu_j])$ indicates a distance between a feature (cepstrum) of the input signal and a feature of the jth speech model. The distance between the features (not including a zero-order cepstrum) is calculated by the distance calculation unit 5. j' in the denominator of Expression (5) indicates the speech model, and summation of the distance $\exp(-d[C(t), \mu_{j'}])$ with respect to the speech model j' indicates the summation with respect to a plurality of the speech models. This summation may be performed on all of the speech models stored in the speech model storage unit 3. Alternatively, the summation may be performed on several higher-order speech models having small feature distances. Derivation of the probability according to Expression (5) may be of course performed by calculation using the feature other than cepstrum.

Next, by using this probability $P(j|C(t))$ and taking a weighted average (expected value) of the respective speech models, the value of a gain $g(t)$ is calculated.

$$g(t) = \exp[\Sigma_j \{\mu_{0,j} - C(0,t)) P(j|C(t))\}] \quad (6)$$

Exp[ ] in the above Expression (6) is applied to get the cepstrum which has been converted to logarithmic form by application of log [ ] in Expression (3) back to the original state.

In the above Expression (6), summation with respect to j indicates the summation with respect to the plurality of the models. This summation is performed with respect to the same models as in Expression (5).

This example shows an instance where the weighted average of the differences between the zeroth cepstrum terms is taken according to the distance between the input signal for each unit time and each of the speech models. Application of exp[ ] may be performed on the differences between the zeroth cepstrum terms as shown in the following Expression (7), in place of Expression (6), to recover the sound pressure ratio. Then, a weighted average of sound pressure values may be taken according to the distance between the input signal for each unit time and each speech model.

$$g(t) = \Sigma_j \{\exp[\mu_{0,j} - C(0,t)] P(j|C(t))\} \quad (7)$$

Alternatively, the gain $g(t)$ may be calculated from the differences between the zeroth cepstral term of the input signal for each unit time and the zeroth cepstral term of the speech model which is closest to the (feature) of the input signal in distance.

$$g(t)=\exp[\mu_{0,k}-C(0,t)] \quad (8)$$

where, k indicates the speech model which is closest to the input signal for each unit time.

Finally, the sound pressure compensation unit 7 takes the product of the gain g(t) calculated by the gain value calculation unit 6 and the input signal X(f,t), thereby compensating for the sound pressure level of the input signal (in step S5).

$$Y(f,t)=g(t)X(f,t) \quad (9)$$

where Y(f,t) indicates a compensated signal. In Y(f,t), f indicates a number in the frequency direction, while t indicates a number (frame number) in the temporal direction, as in X(f,t).

In this example, there has been described an example where the sound level of the input signal is compensated for each frame which is a unit on which the input signal is extracted for each time. The gains g(t) for a plurality of frames may be smoothed or averaged, thereby compensating for the sound pressure level for the plurality of frames.

Next, an effect of this example will be described.

Figure 3:
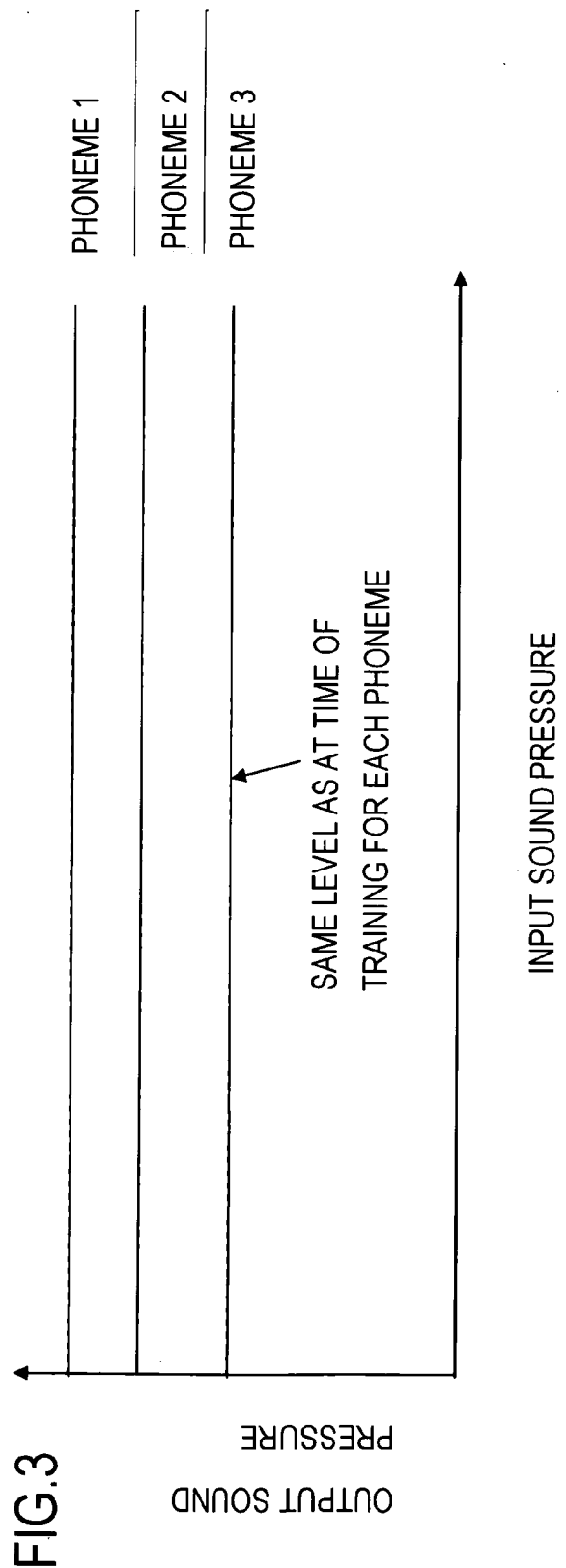
FIG. 3 is a graph showing characteristics of an input sound pressure and an output sound pressure in the first example of the present invention.

According to this example, the speech models each trained with the speech having a predetermined sound pressure in advance are employed. Thus, as shown in FIG. 3, a sound pressure difference for each phoneme can be reflected.

Further, according to this example, the speech models are used. A target speech may be thereby accurately emphasized, without emphasizing unwanted noise.

Further, according to this example, the weighted average according to the difference between the input signal for each time and each of the speech models is employed for calculation of the gain. The need for preparing a plurality of the speech models or performing estimation a plurality of times for each of all the phonemes is thereby eliminated. Accordingly, the gain control system with a reduced capacity and computation cost can be provided.

EXAMPLE 2

Figure 4:
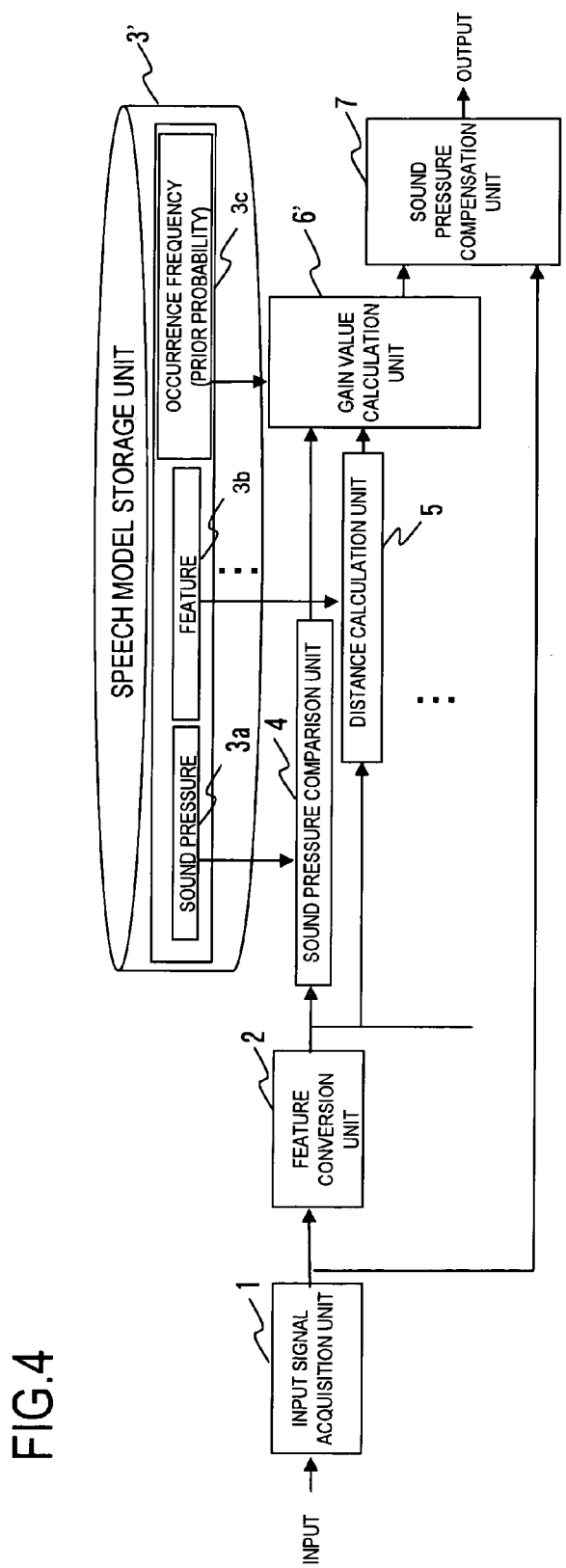
FIG. 4 is a diagram showing a configuration of a system in a second example of the present invention.

FIG. 4 is a diagram showing a configuration of a second example of the present invention. Referring to FIG. 4, a speech model storage unit 3' includes a sound pressure, a feature, and a speech model occurrence frequency (prior probability) for each phoneme or for each cluster unit of dividing a speech. That is, the speech model storage unit 3' is obtained by adding output frequency information to the speech model storage unit 3 in the first example. A gain value calculation unit 6' in the second example of the present invention calculates a gain from a sound pressure ratio calculated by the sound pressure comparison unit 4 for each speech model, a distance calculated by the distance calculation unit 5 for each speech model, and the occurrence frequency (prior probability) of each speech model.

Each speech model stored in the speech model storage unit 3' is constituted from the sound pressure 3*a*, the feature 3*b*, and an occurrence frequency (prior probability) 3*c*. Though no particular limitation is imposed on the present invention, this example uses a GMM as the speech model. As an alternative other than the GMM, an HMM used for speech recognition may also be employed.

As the sound pressure 3*a*, the zeroth cepstrum component is used, as in the first example described above. As the feature 3*b*, a value obtained by converting a speech into the feature may be employed, or a density distribution of probabilities of outputting the value may be employed.

The occurrence frequency (prior probability) 3*c* is the frequency of occurrence of a target speech model from among a plurality of speech models.

The sound pressure 3*a*, feature 3*b*, and occurrence frequency (prior probability) 3*c* are trained using the Expectation Maximization (EM) algorithm or the like (refer to Non-patent Document 1).

In this example, the gain value calculation process in step S4 in the first example is substituted for another process.

The gain value calculation unit 6' estimates the gain from the zeroth cepstrum component difference calculated by the sound pressure comparison unit 4 for each speech model, the distance calculated by the distance calculation unit 5 for each speech model, and the occurrence frequency 3*c* of the corresponding speech model.

Specifically, the probability (posterior probability) that the jth speech model is selected is first calculated.

$$P(j|C(t))=P(j)\exp(-d[C(t),\mu_j])/\Sigma_{j'}P(j')\exp(-d[C(t),\mu_{j'}]) \quad (10)$$

In Expression (10), $\exp(-d[C(t), \mu_j])$ indicates the distance between the feature (cepstrum) of an input signal and the feature of the jth speech model (in which C(0,t) is excluded from C(t)).

P(j) indicates the occurrence frequency of the jth speech model.

Summation of $\{\Sigma_{j'}P(j')\exp(-d[C(t), \mu_{j'}])\}$ in the denominator with respect to the j'th speech model indicates the summation with respect to a plurality of the speech models. This summation may be performed on all of the speech models stored in the speech model storage unit 3'. Alternatively, the summation may be performed on several upper speech models, the feature distance of which is closer.

By taking a weighted average (expected value) of the respective speech models using this probability P(j|C(t)), the value of the gain is calculated. Specifically, the gain value is calculated, using Equations (6), (7), or (8), as in the first example.

Next, an effect of this example will be described.

On contrast with the first example, information on the occurrence frequency (prior probability) prepared for in advance by training is used when determining the probability that each speech model is selected. Phoneme characteristics can be thereby estimated accurately.

EXAMPLE 3

Figure 5:
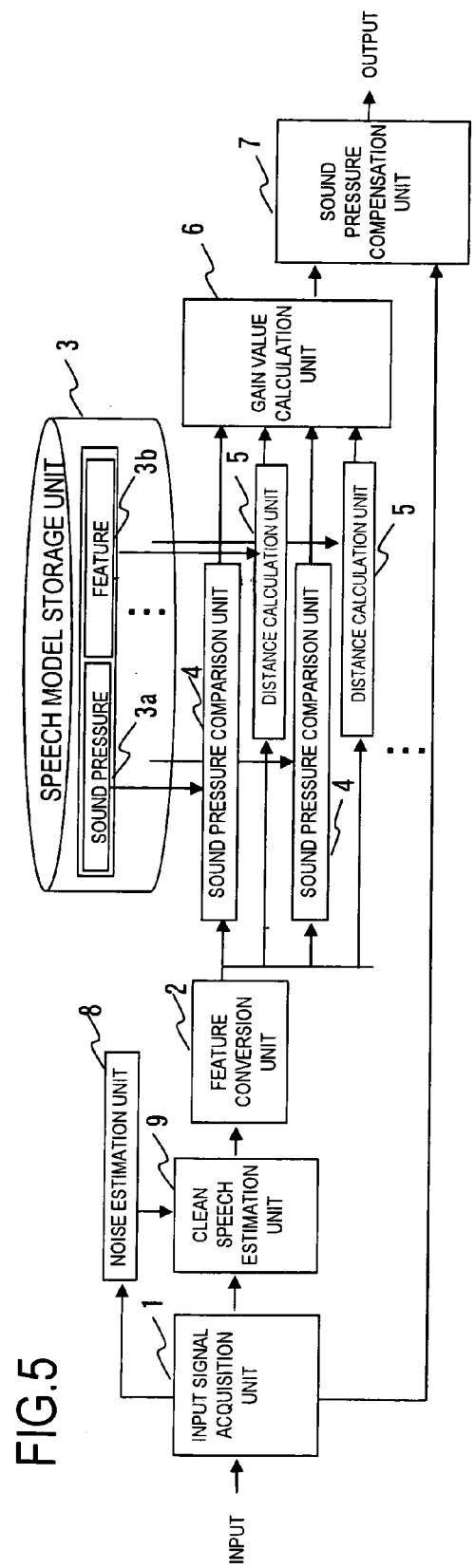
FIG. 5 is a diagram showing a configuration of a system in a third example of the present invention.

FIG. 5 is a diagram showing a configuration of a third example of the present invention. Referring to FIG. 5, the third example of the present invention further includes a noise estimation unit 8 that obtains a noise component from an input signal and a clean speech estimation unit 9 that estimates a speech from the input signal and the noise estimated by the noise estimation unit 8 and outputs the speech.

In the noise estimation unit 8, first several frames of the input signal are regarded as an unvoiced speech segment, for example. Then, the noise is estimated from the average value of the input signal in this segment.

The clean speech estimation unit 9 estimates the clean speech with the noise component removed therefrom, using a noise suppression approach such as a spectral subtraction method shown in Non-patent Document 6, an input speech, and information on the noise component obtained by the noise estimation unit 8, and outputs the estimated clean speech. The spectral subtraction method is the one in which a noise component is subtracted from an input signal for each frequency component in the spectral domain.

The feature conversion unit 2 receives the clean speech with the noise component suppressed therein, output from the clean speech estimation unit 9, and extracts the feature and the sound pressure of the clean speech.

According to the third example, compared with the first example shown in FIG. 1 (not including the noise estimation unit 8 and the clean speech estimation unit 9) a target speech can be accurately emphasized without emphasizing the noise component of the target speech.

EXAMPLE 4

Figure 6:
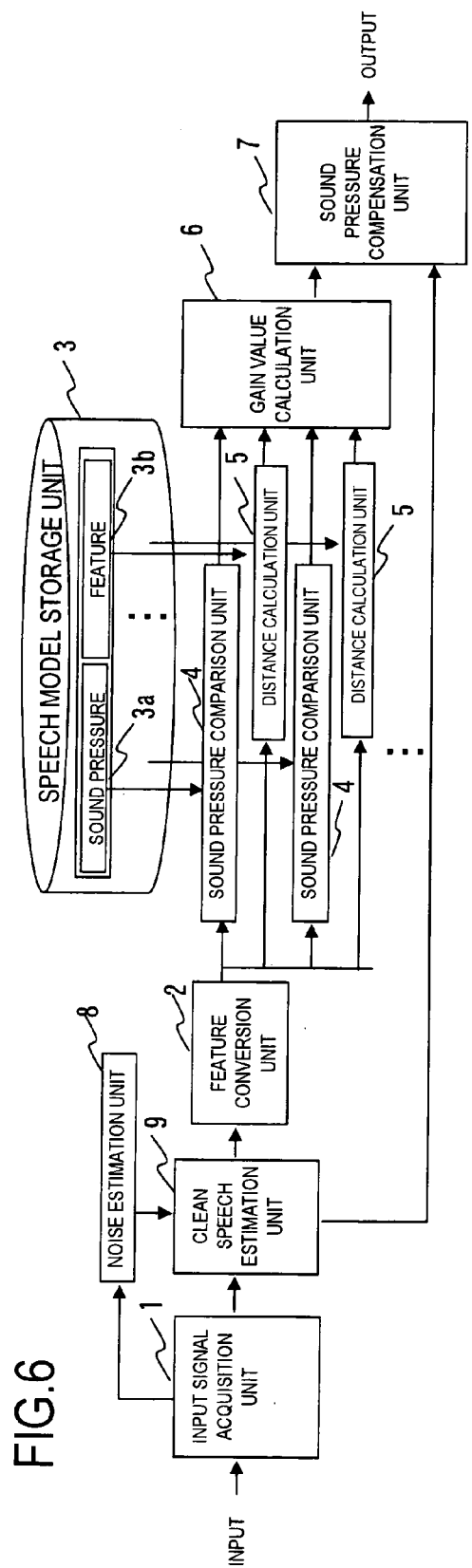
FIG. 6 is a diagram showing a configuration of a system in a fourth example of the present invention.

Next, a fourth example of the present invention will be described. In the third example shown in FIG. 5, the sound pressure compensation unit 7 compensates for the sound pressure of an input signal using a gain calculated by the gain value calculation unit 6. On contrast therewith, in the fourth example of the present invention, referring to FIG. 6, the sound compensation unit 7 compensates for the sound pressure of a clean speech estimated by the clean speech estimation unit 9, using a gain calculated by the gain value calculation unit 6.

EXAMPLE 5

Figure 7:
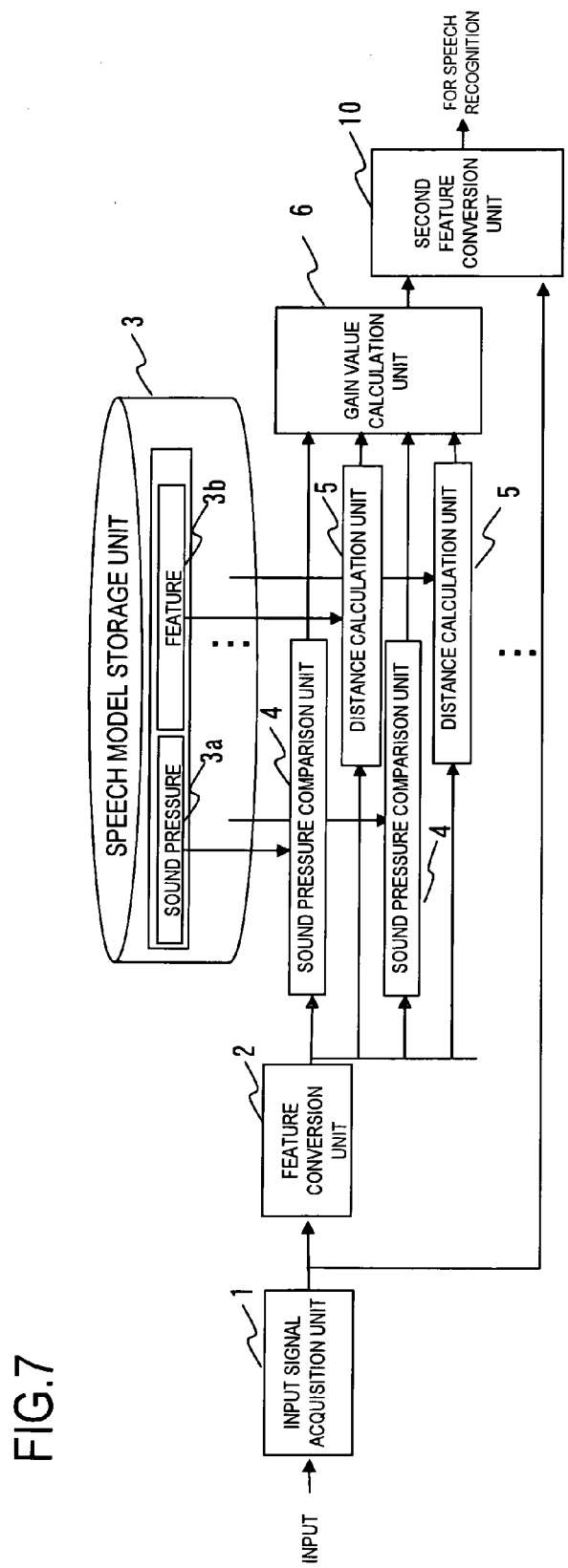
FIG. 7 is a diagram showing a configuration of a system in a fifth example of the present invention.

Next, a fifth example of the present invention will be described. Referring to FIG. 7, the fifth example of the present invention is obtained by replacing the sound pressure compensation unit 7 that compensates for the sound pressure of an input signal using a gain in the first example shown in FIG. 1 with a second feature conversion unit 10 that calculates a feature used in speech recognition from the gain and the input signal. The other configuration is the same as that of the first example.

The second feature conversion unit 10 that calculates the feature from the input signal and the gain may use the feature different from a feature calculated by the feature conversion unit 2 that calculates the feature from the input signal.

For example, in the feature conversion unit 10, an amount that does not depend on the sound pressure may be used as the feature, and gain control may be performed. Then, the feature conversion unit 2 may use the feature that depends on the sound pressure.

EXAMPLE 6

Figure 8:
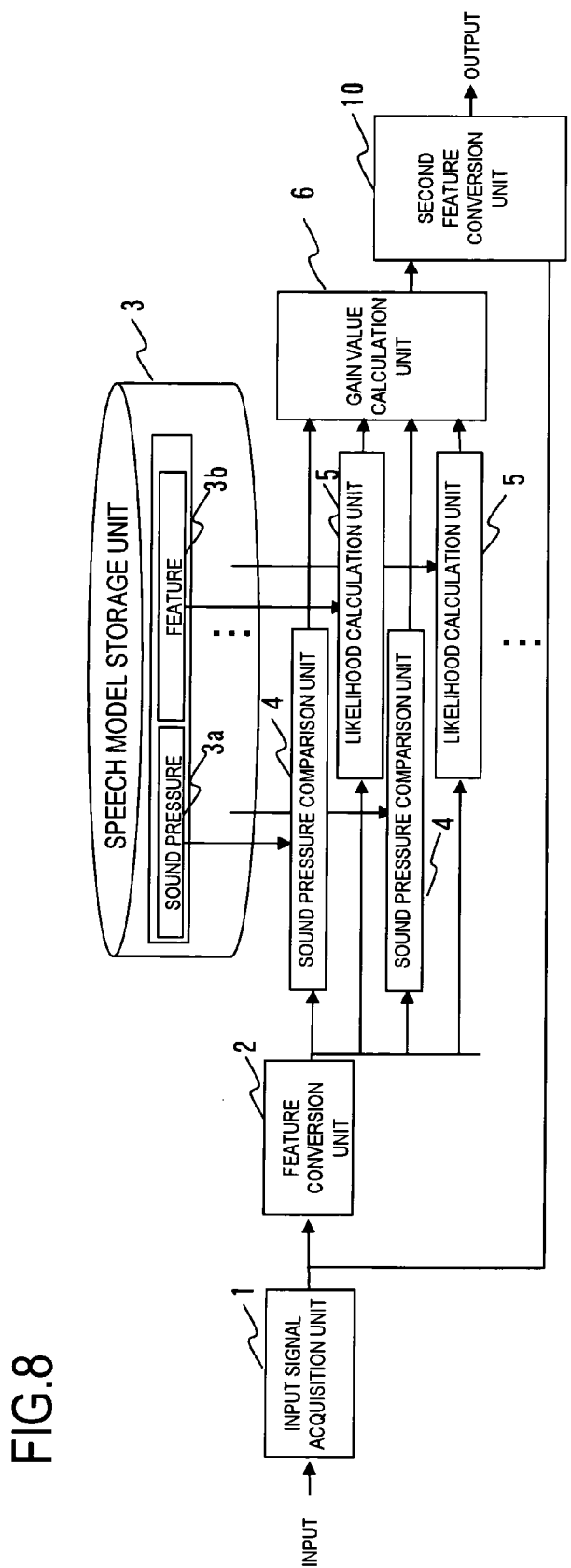
FIG. 8 is a diagram showing a configuration of a system in a sixth example of the present invention.
Figure 9:
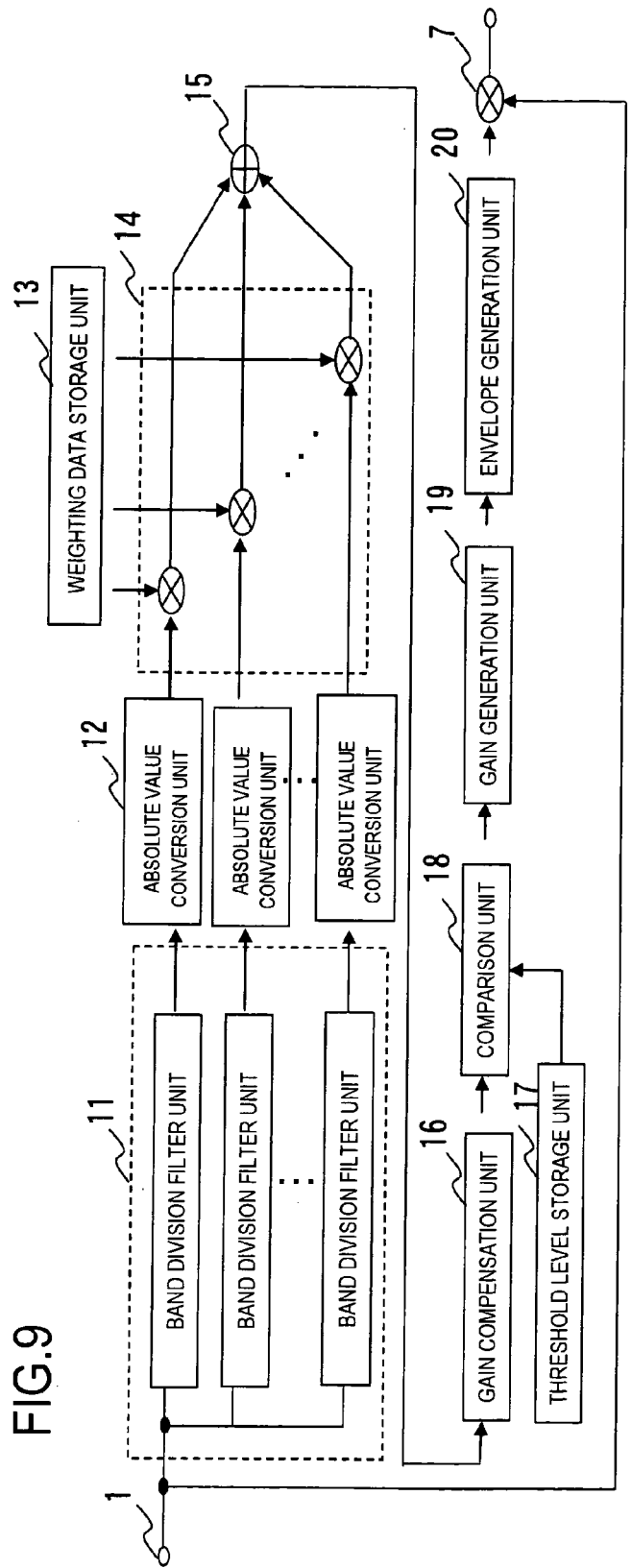
FIG. 9 is a block diagram showing a configuration of a conventional gain control system in which noise is suppressed.
Figure 10:
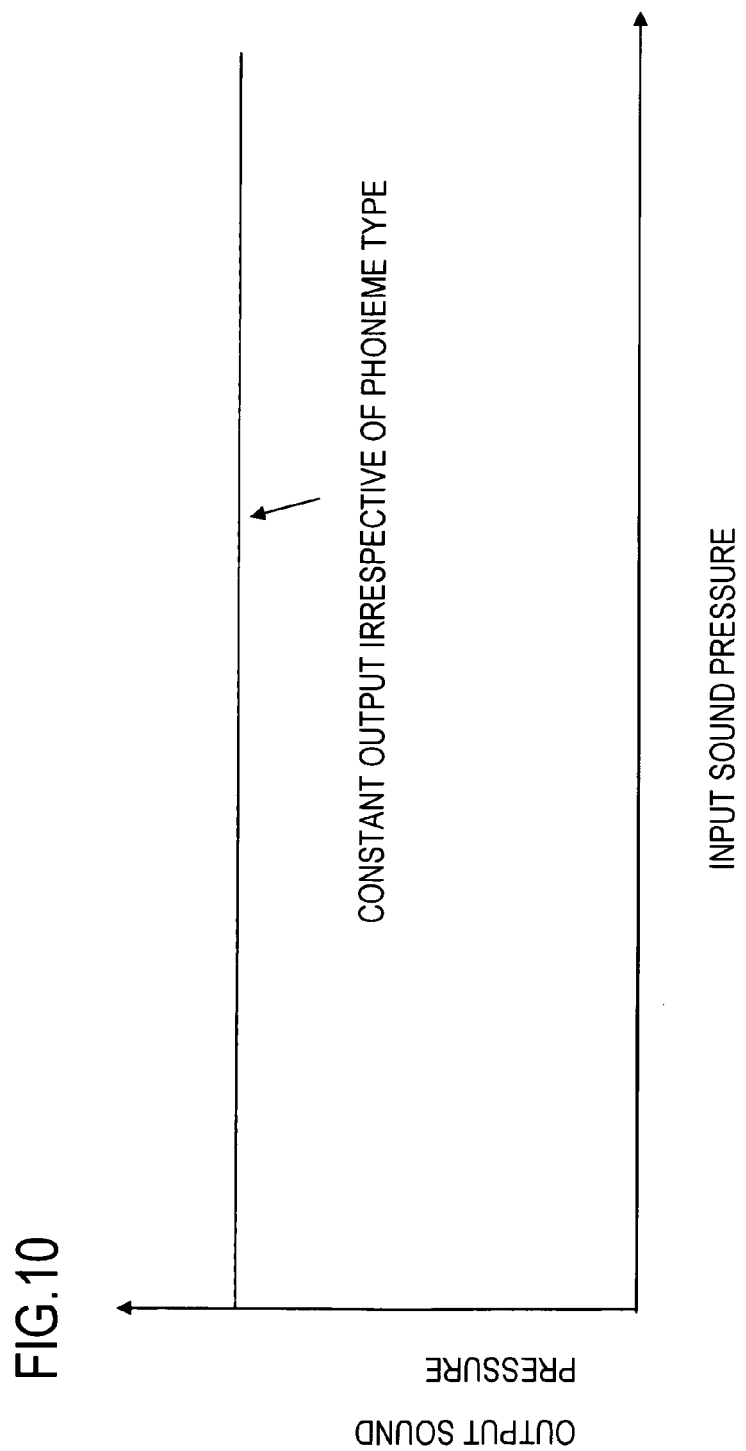
FIG. 10 is a graph showing characteristics of an input sound pressure and an output sound pressure in the conventional gain control system.

Next, a sixth example of the present invention will be described. In the fifth example, the second feature conversion unit 10 calculates a feature used in speech recognition from a gain calculated by the gain value calculation unit 6 and an input signal. Referring to FIG. 8, in the sixth example of the present invention, the second feature conversion unit 10 compensates for a feature calculated by the feature conversion unit 2 using a gain calculated by the gain value calculation unit 6 and sets the compensated value to a second feature used in speech recognition. The second feature conversion unit 10 performs processing of multiplying the feature calculated by the feature conversion unit 2 by the gain, or the like, for example.

EXAMPLE 7

Figure 11:
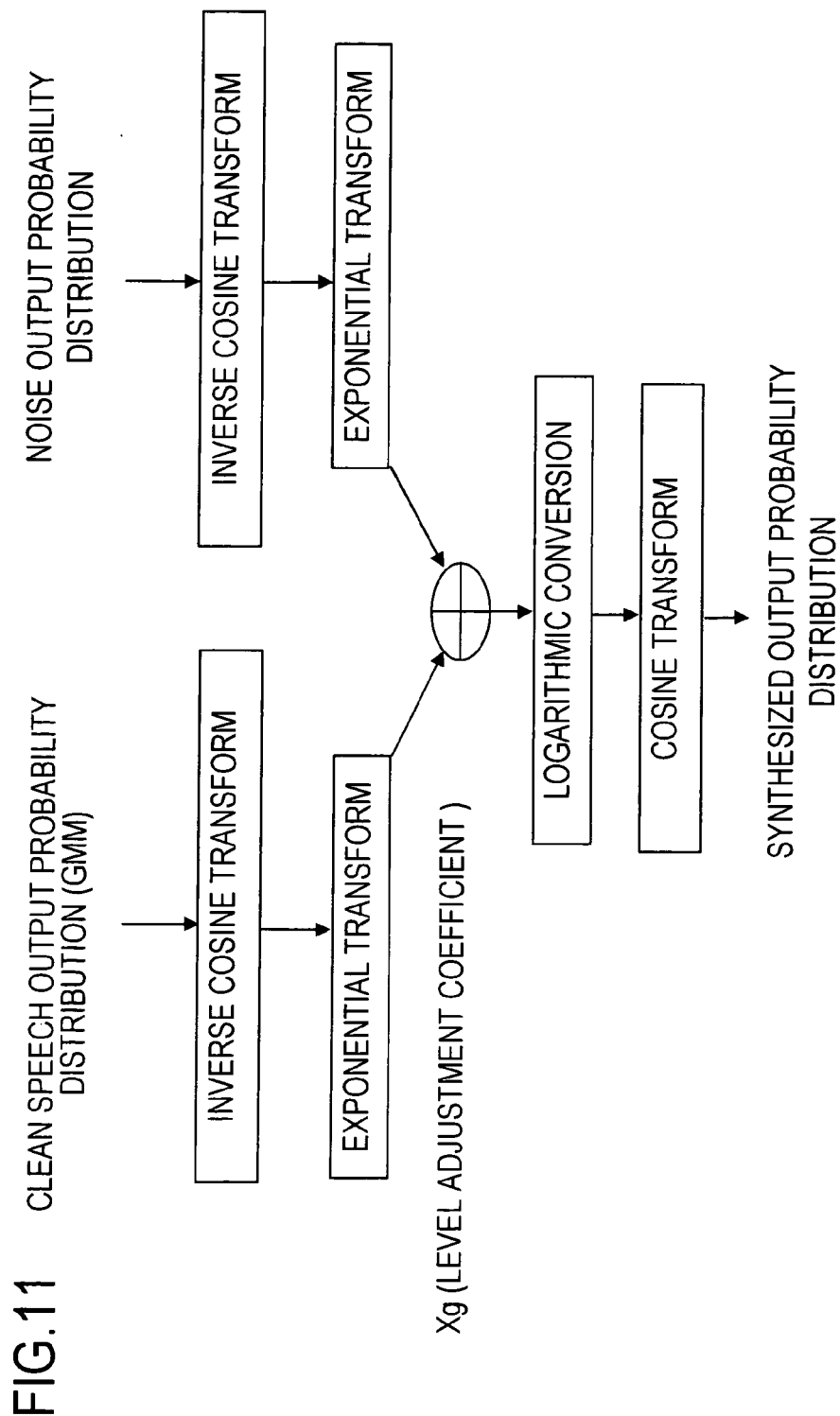
FIG. 11 is a diagram showing a conventional method of synthesizing a speech model and a noise model.

Next, a seventh example of the present invention will be described. In an approach as shown in FIG. 11 where a speech model is adapted to noise, a gain calculated by the gain calculation unit 6 in the first example is used to obtain a level adjustment coefficient shown in FIG. 11. Gains calculated by the gain value calculation unit 6 may be averaged over a plurality of frames and a plurality of utterances rather than directly using the gain calculated by the gain value calculation unit 6 for each unit time when an input signal is extracted. The first through sixth examples described above may also be combined with one another and may be used.

According to the present invention, the sound pressure of a speech can be made constant, and communication and recording of a clear speech easy to hear can be performed.

Further, by combining the gain control system with a speech recognition system, recognition that is robust to variations in the sound pressure of speech can be performed. The gain control system may also be applied to a hearing aid.

The above description of the present invention was given in connection with the examples described above. The present invention is not limited to the configurations of the embodiments described above, and of course includes various variations and modifications that could be made by those skilled in the art within the scope of the present invention.

The invention claimed is:

1. A gain control system that adjusts a sound pressure of an input signal and produces the adjusted signal, comprising:
    an input signal acquisition unit, of a computer, that acquires a speech signal supplied from an input device and extracts the speech signal for each unit time;
    a feature conversion unit, of the computer, that calculates a feature and the sound pressure from the input signal extracted for the each unit time;
    a speech model storage unit that stores therein a speech model having a feature and sound pressure information for each plural phonemes or for each of clusters into which a speech is divided;
    a distance calculation unit, of the computer, that calculates a distance between the feature of the input signal extracted for the each unit time and the feature of the speech model stored in the speech model storage unit;
    a sound pressure comparison unit, of the computer, that calculates a ratio between the sound pressure of the input signal extracted for the each unit time and a sound pressure of the speech model stored in the speech model storage unit;
    a gain value calculation unit, of the computer, that calculates a gain, based on the distance and the sound pressure ratio calculated for the speech model; and
    a sound pressure compensation unit, of the computer, that compensates for the sound pressure of the input signal extracted for the each unit time, using the gain calculated by the gain value calculation unit,
    wherein the speech model storage unit further stores and bolds occurrence frequency information on the speech model; and
    the gain value calculation unit performs gain calculation based on the distance and the sound pressure ratio calculated for the speech model and a frequency of occurrence of the speech model stored in the speech model storage unit.

2. The gain control system according to claim 1, wherein the gain value calculation unit takes a weighted average of the sound pressure ratio between the input signal extracted for the each unit time and the speech model for each phoneme or for each of clusters into which a speech is divided, using the distance between the input signal extracted for the each unit time and the speech model to calculate the gain.

3. The gain control system according to claim 1, comprising:
    a noise estimation unit, of the computer, that obtains a noise component from the input signal; and a clean speech estimation unit, of the computer, that calculates a signal which is obtained by suppressing the noise component estimated by the noise estimation unit from the input signal and produces a signal with the noise component suppressed therein, the feature conversion unit receiving the signal with the noise component suppressed therein, produced by the clean speech estimation unit, and extracting a feature and sound pressure from the received signal.

4. The gain control system according to claim 3, wherein the sound pressure compensation unit receives the signal with the noise component suppressed therein, produced by the clean speech estimation unit, and compensates for the sound pressure.

5. The gain control system according to claim 1, wherein the sound pressure compensation unit smoothes or averages the gain obtained for the each unit time over a plurality of the unit times, and performs sound pressure control over the plurality of the unit times.

6. A speech recognition system, wherein the gain control system according to claim 1 includes
a second feature conversion unit, of the computer, that calculates a feature used in speech recognition from the gain calculated by the gain value calculation unit and the input signal, in place of the speech compensation unit,
using the feature calculated by the second feature conversion unit, the speech recognition being performed.

7. A speech recognition system, wherein the gain control system according to claim 1 includes
a second feature conversion unit, of the computer, that compensates for the feature obtained by the feature conversion unit and calculates a feature used in speech recognition using the gain calculated by the gain value calculation unit, in place of the speech compensation unit,
using the feature calculated by the second feature conversion unit, the speech recognition being performed.

8. The speech recognition system according to claim 6, comprising:
a unit, of the computer, that adapts the speech model to noise based on the calculated gain and performs the speech recognition using the speech model adapted to the noise.

9. A gain control method of adjusting a sound pressure of an input signal and outputting the adjusted signal, the method comprising:
storing in a speech model storage unit a speech model having a feature and sound pressure information in each phoneme or each of clusters into which a speech is divided;
acquiring, via a computer, a speech signal supplied from an input device and extracting the speech signal for each unit time;
calculating, via the computer, a feature and the sound pressure from the input signal extracted for the each unit time;
calculating, via the computer, a distance between the feature of the input signal extracted for the each unit time and the feature of the speech model stored in the speech model storage unit;
calculating, via the computer, a ratio between the sound pressure of the input signal extracted for the each unit time and a sound pressure of the speech model stored in the speech model storage unit;
calculating, via the computer, a gain, based on the distance and the sound pressure ratio calculated for the speech model; and compensating, via the computer, for the sound pressure of the input signal extracted for the each unit time, using the calculated gain,
wherein the speech model storage unit further stores and holds occurrence frequency information on the speech model, and
in calculating the gain, gain calculation is performed based on the distance and the sound pressure ratio calculated for the speech model and a frequency of occurrence of the speech model stored in the speech model storage unit.

10. The gain control method according to claim 9, wherein in calculating the gain, a weighted average of the sound pressure ratio between the input signal extracted for the each unit time and the speech model for the each phoneme or the each of clusters into which a speech is divided is taken, using the distance between the input signal extracted for the each unit time and the speech model to calculate the gain.

11. The gain control method according to claim 9, comprising:
obtaining, via the computer, a noise component from the input signal; and
calculating, via the computer, a signal with a noise component suppressed from the input signal and producing a signal with the noise component suppressed therein;
in calculating the feature, the signal with the noise component suppressed therein being received as the input signal, and a feature and a sound pressure being extracted from the received signal.

12. The gain control method according to claim 11, wherein in compensating for the sound pressure, the signal with the noise component suppressed therein is received, and the sound pressure is compensated for.

13. The gain control method according claim 9, wherein in compensating for the sound pressure, the gain obtained for the each unit time is smoothed or averaged over a plurality of the unit times, and sound pressure control is performed over the plurality of the unit times.

14. The gain control method according to claim 9, wherein instead of the step of compensating for the sound pressure, the method including calculating a feature with the sound pressure adjusted therein from the calculated gain and the input signal.

15. A non-transitory computer readable storage medium storing a program for a computer that performs gain control of adjusting a sound pressure of an input signal and outputting the adjusted signal, the computer comprising a speech model storage unit that stores therein a speech model having a feature and sound pressure information for each phoneme or each of clusters into which a speech is divided, the program causing the computer to execute:
a process of storing in the speech model storage unit a speech model having a feature and sound pressure information for the each phoneme or the each of clusters into which a speech is divided;
a process of acquiring a speech signal supplied from an input device and extracting the speech signal for each unit time;
a process of calculating a feature and a sound pressure from the input signal extracted for the each unit time;
a process of calculating a distance between the feature of the input signal extracted for the each unit time and the feature of the speech model stored in the speech model storage unit;

a process of calculating a ratio between the sound pressure of the input signal extracted for the each unit time and a sound pressure of the speech model stored in the speech model storage unit;

process of calculating a gain, based on the distance and the sound pressure ratio calculated for the speech model; and a process of compensating for the sound pressure of the input signal extracted for the each unit time, using the calculated gain, wherein the speech model storage unit further stores and holds occurrence frequency information on the speech model; and in the process of calculating the gain, the computer is caused to execute a process of performing gain calculation based on the distance and the sound pressure ratio calculated for the speech model, and a frequency of occurrence of the speech model stored in the speech model storage unit.

16. The non-transitory computer readable storage medium according to claim 15, wherein in the process of calculating the gain, the computer is caused to execute a process of taking a weighted average of the sound pressure ratio between the input signal extracted for the each unit time and the speech model for each phoneme or each of clusters into which a speech is divided, using the distance between the input signal extracted for the each unit time and the speech model, to calculate the gain.

17. The non-transitory computer readable storage medium according to claim 15, wherein the program causes the computer to execute:

a process of obtaining a noise component from the input signal;

a process of calculating a signal with a noise component suppressed from the input signal and outputting a signal with the noise component suppressed therein; and a process of receiving the signal with the noise component suppressed therein as the input signal, and extracting a feature and a sound pressure from the input signal.

18. The non-transitory computer readable storage medium according to claim 17, wherein in the process of compensating for the sound pressure, the computer is caused to execute a process of receiving a signal with the noise component suppressed therein and compensating for a sound pressure.

19. The non-transitory computer readable storage medium according to claim 15, wherein in the process of compensating for the sound pressure, the computer is caused to execute a process of smoothing or averaging the gain obtained for the each unit time over a plurality of the unit times, and performing sound pressure control over the plurality of the unit times.

20. The non-transitory computer readable storage medium according to claim 15, causing the computer to execute a process of calculating a feature with the sound pressure adjusted therein from the calculated gain and the input signal instead of the process of compensating for the sound pressure.

* * * * *